United States Patent
Hawkins et al.

(10) Patent No.: US 12,519,636 B2
(45) Date of Patent: Jan. 6, 2026

(54) CRYPTOGRAPHIC PROCESSING

(71) Applicant: Omnissa, LLC, Mountain View, CA (US)

(72) Inventors: Siavash James Joorabchian Hawkins, Canterbury (GB); Krishna Shanbhag B, Bangalore (IN); Sanyam Jain, Vidisha (IN)

(73) Assignee: Omnissa, LLC, Mountain View, CA (US)

( * ) Notice: Subject to any disclaimer, the term of this patent is extended or adjusted under 35 U.S.C. 154(b) by 335 days.

(21) Appl. No.: 17/960,896

(22) Filed: Oct. 6, 2022

(65) Prior Publication Data

US 2024/0022418 A1    Jan. 18, 2024

(30) Foreign Application Priority Data

Jul. 15, 2022   (IN) .............................. 202241040532

(51) Int. Cl.
  *H04L 9/08* (2006.01)
  *G06F 21/12* (2013.01)
  *G06F 21/62* (2013.01)
  *H04L 9/32* (2006.01)

(52) U.S. Cl.
  CPC ............ *H04L 9/0897* (2013.01); *G06F 21/62* (2013.01); *H04L 9/3226* (2013.01); *G06F 21/12* (2013.01)

(58) Field of Classification Search
  CPC . H04L 9/3226; H04L 9/0897; H04L 2209/76; G06F 21/12; G06F 21/26
  See application file for complete search history.

(56) References Cited

U.S. PATENT DOCUMENTS

| | | | |
|---|---|---|---|
| 8,166,294 B1* | 4/2012 | Sangster | H04L 9/088 713/189 |
| 9,020,149 B1* | 4/2015 | Golwalkar | H04L 9/0897 380/278 |
| 11,475,140 B1* | 10/2022 | Buonora | G06F 21/602 |
| 2006/0149962 A1* | 7/2006 | Fountain | H04L 9/0897 713/151 |
| 2017/0346636 A1* | 11/2017 | Hernacki | H04L 63/06 |
| 2017/0373835 A1* | 12/2017 | Yamamoto | H04L 9/0891 |
| 2021/0034764 A1* | 2/2021 | Balinsky | G06F 3/1238 |
| 2023/0122687 A1* | 4/2023 | Nakagawa | H04L 9/088 713/171 |
| 2023/0177171 A1* | 6/2023 | Kushtagi | G06F 21/44 713/155 |
| 2023/0254313 A1* | 8/2023 | Powell | H04L 63/0428 713/150 |

\* cited by examiner

Primary Examiner — Robert B Leung
(74) Attorney, Agent, or Firm — Kim & Stewart LLP (57) ABSTRACT

Disclosed are various embodiments for cryptographic processing on client devices. A cryptographic service can receive a cryptographic operation request from a client application. The cryptographic operation request can include a key identifier for a private key and data to be cryptographically processed and the cryptographic operation request specifying a cryptographic operation to be performed. A cryptographic provider can then be identified based at least in part on the key identifier for the private key. A request is subsequently sent to the cryptographic provider to perform the cryptographic operation on the data using the private key. A response is then received from the cryptographic provider and sent to the client application.

17 Claims, 3 Drawing Sheets

CRYPTOGRAPHIC PROCESSING

RELATED APPLICATIONS

Benefit is claimed under 35 U.S.C. 119(a)-(d) to Foreign Application Serial No. 202241040532 filed in India entitled "CRYPTOGRAPHIC PROCESSING", on Jul. 15, 2022, by VMware, Inc., which is herein incorporated in its entirety by reference for all purposes.

BACKGROUND

There are a number of cryptographic accessories, services, or providers available to application developers. However, there is not necessarily a standardized mechanism for interacting with these cryptographic accessories, services, or providers. For example, many cryptographic accessories, services, or providers may be compatible with ANDROID® mobile devices, but lack standard integration with the JAVA Cryptography Architecture (JCA). As a result, each ANDROID application with a cryptography requirement must integrate specifically with every cryptographic accessory, service, or provider it plans on supporting.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing cryptographic services to client applications which do not support or offer cryptographic operations. Many cryptographic accessories or providers exist, offered by different vendors, which can be used by client applications to perform cryptographic operations. These cryptographic providers could be implemented in hardware or software, and often store private key material so that the client application lacks access to the key material. If the client application needs to use the key to perform a cryptographic operation, it can send a request to the cryptographic provider (e.g., to digitally sign data, to decrypt data, etc.). The cryptographic provider can then perform the operation and return the result, without disclosing the private key material.

However, many vendors of these cryptographic accessories or providers require a client application 113 to implement or incorporate a vendor supplied library to make use of these features. As a result, different client applications installed on the same device may support different sets of cryptographic hardware, accessories, or providers, some of which may not be installed or supported by the client device.

Accordingly, various embodiments of the present disclosure implement a cryptographic service that offers a standardized application programming interface (API), such as the JAVA Cryptography Architecture (JCA), that can be used by any application installed on the client device. Individual client applications therefore no longer have to support cryptographic providers explicitly. Instead, a standardized API can be used, and the cryptographic service can be responsible for implementing vendor specific code. Moreover, the cryptographic service can be extended to support a larger variety of vendors, including any vendors whose cryptographic provider is installed on or accessible to the client device. As a result, the security of the client device is improved by offering cryptographic services to all client applications installed on the client device in standardized manner.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
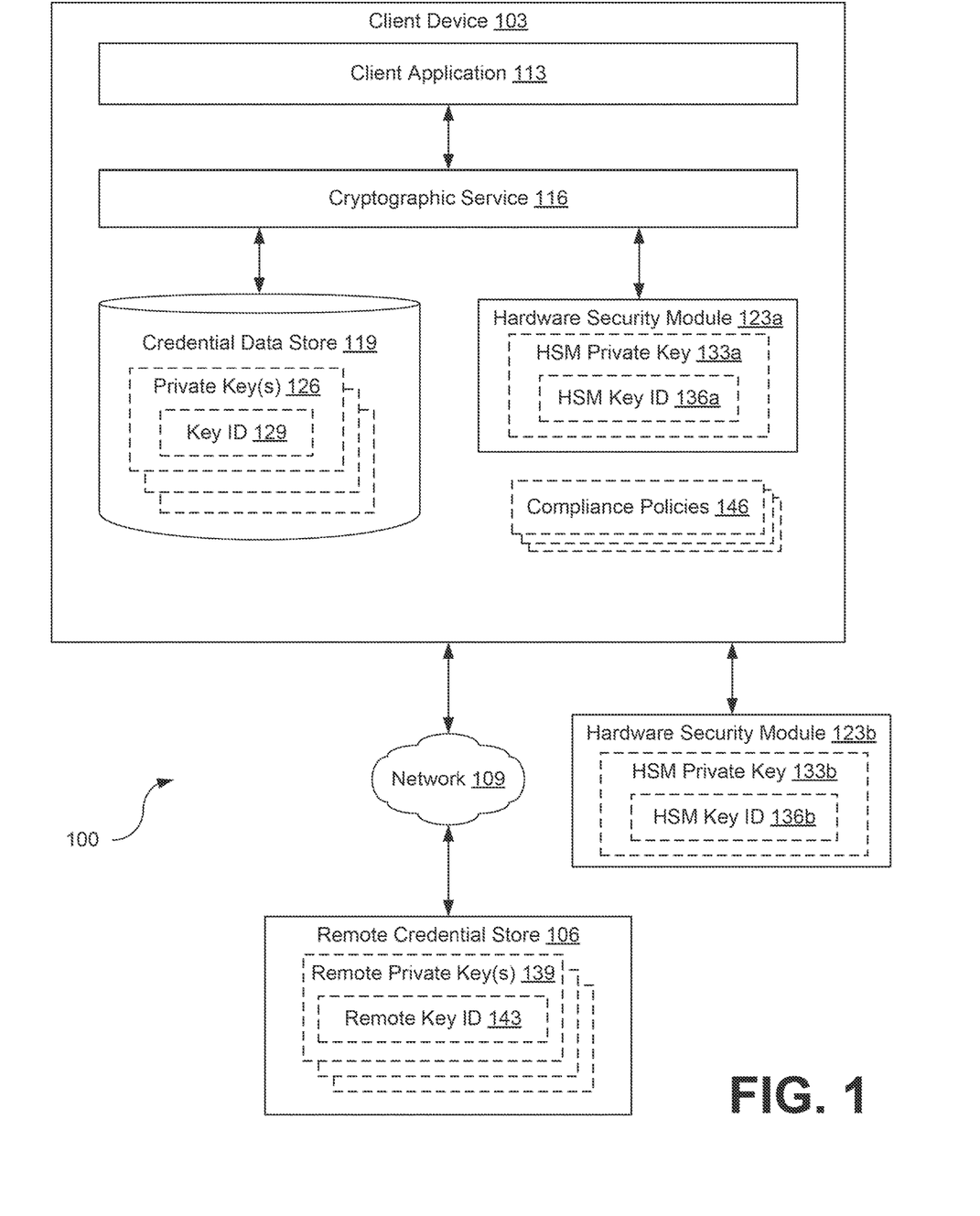
FIG. 1 is a schematic block diagram of a network environment according to various embodiments of the present disclosure.

With reference to FIG. 1, shown is a network environment 100 according to various embodiments. The network environment 100 can include a computing device 103, and a remote credential store 106, which can be in data communication with each other via a network 109.

The client device 103 can represent any computing device used to execute applications, such as the client application 113, on behalf of a user. Accordingly, the client device 103 can include one or more processors, memory, one or more network interface cards, and various other hardware components. Examples of client devices 103 can include personal computers (e.g., a desktop computer, a laptop computer, or similar device), mobile computing devices (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 103 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 103 or can be connected to the client device 103 through a wired or wireless connection.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The client application 113 can be executed by the client device 103 to access content via the network 109 or to perform one or more tasks on the client device 103. To this end, the client application 113 can include any application that could be installed on the client device 103, such as a browser, email application, document management or file management application, video or voice over IP (VoIP) application, chat or messaging application, file sharing application, file editing application (e.g., word processor, spreadsheet program, presentation program, etc.), social networking applications, etc.

The client device 103 can also execute a cryptographic service 116, which may be in communication with the client application 113 using various inter-process communication approaches. The cryptographic service 116 can be executed to provide an interface between the client application 113 and various cryptographic providers, thereby allowing the client application 113 the ability to utilize any cryptographic provider supported by the cryptographic service 116 without having to implement support directly within the client application 113. The operation of and the interactions between the client application 113, cryptographic service 116, and various cryptographic providers are described later in the present disclosure. In those implementations where the client device 103 hosts a copy of the ANDROID® operating system, both the client application 113 and the cryptographic service 116 could be ANDROID applications.

Cryptographic providers can include any hardware device, software service, or combination thereof, that can perform cryptographic operations on behalf of another application using a cryptographic key controlled by or in possession of the cryptographic provider. This allows for cryptographic key material to be securely stored and segregated from the client application 113, while still allowing for the client application 113 to perform cryptographic operations as needed. For example, cryptographic providers could be utilized to decrypt data using a cryptographic key controlled by the cryptographic provider. As another example, a cryptographic provider could be used to sign data (e.g., a file, a message, etc.) using a cryptographic key controlled by the cryptographic provider. Moreover, multiple cryptographic providers can be available to the cryptographic service 116 of the client device 103. Examples of cryptographic providers can include the remote credential store 106, a credential data store 119, a hardware security module 123, etc.

The credential data store 119 can be representative of one or more data stores or databases that stores user credentials, such as cryptographic keys or certificates issued to the user of the client device 103. In some implementations, credentials stored in the credential data store 119 can be provided to applications upon request. However, in other implementations, the credential data store 119 could be configured to provide an application programming interface (API) that allows applications to request specific cryptographic operations be performed using a private key 126 stored in the credential data store 119. For example, the API could allow for the credential data store 119 to sign an arbitrary piece of data using a private key 126 and provide the signature in response. As another example, the credential data store 119 could decrypt an arbitrary piece of data encrypted using a respective public key for the private key 126 and provide the decrypted data in response.

A private key 126 stored in the credential data store 119 can represent the private cryptographic key of a respective public key in a public-private key pair. Because multiple private keys could be issued to the same user or device, each private key 126 could be associated with or identified by as key identifier 129, which serves to uniquely identify a private key 126 with respect to other private keys 126 specifically, as well as other private keys (e.g., HSM private keys 133) generally.

The hardware security modules (HSMs) 123a and 123b (collectively the "HSMs 123" and generically an "HSM 123") can represent dedicated microcontrollers the securely stores a private key (e.g., HSM private key 133a and HSM private key 133b, collectively the "HSM private keys 133" and generically an "HSM private key 133") and provides support for various cryptographic operations or primitives. This can include performing various cryptographic functions on behalf of the client application 113 or the cryptographic service 116. For example, the HSM 123 could sign an arbitrary piece of data using the HSM private key 133 and provide the signature in response without disclosing the HSM private key 133. Similarly, the HSM 123 could decrypt an arbitrary piece of data encrypted using a respective public key for the HSM private key 133 and provide the decrypted data in response without disclosing the HSM private key 133.

HSMs 123 can be connected to the client device 103 in a variety of manners. In some instances, an HSM 123 could be installed in or be a component of the client device 103, as illustrated by HSM 123a. In other instances, HSMs 123 could be externally connected to the client device 103, as illustrated by HSM 123b. Examples of HSMs 123 include trusted platform module (TPM) chips installed in the client device 103, or portable hardware authentication devices that can be connected to the client device 103 when needed (e.g., YUBIKEY® manufactured by YUBICO®, TITAN® manufactured by GOOGLE®, etc.).

An HSM private key 133 stored in the HSM 123 can represent the private cryptographic key of a respective public key in a public-private key pair. Because multiple private keys could be issued to the HSM 123, each HSM private key 133 could be associated with or identified by an HSM key identifier 136 (e.g., HSM key identifier 136a and HSM key identifier 136b, collectively the "HSM key identifiers 136" and generically an "HSM key identifier 136"), which serves to uniquely identify the HSM private key 136 with respect to other HSM private keys 136 specifically, as well as other private keys (e.g., private keys 126) generally.

The remote credential store 106 can represent a network 109 accessible system or service that securely stores a private key, referred to as the remote private key 139 for clarity, and provides support for various cryptographic operations or primitives. In some implementations, credentials stored in the remote credential store 106 can be provided to applications upon request. However, in other implementations, remote credential store 106 could be configured to provide an application programming interface (API) that allows applications to request specific cryptographic operations be performed using a remote private key 139 stored in the remote credential store 106. For example, the API could allow for the remote credential store 106 to sign an arbitrary piece of data using a remote private key 139 and provide the signature in response. As another example, the remote credential store 106 could decrypt an arbitrary piece of data encrypted using a respective public key for the remote private key 139 and provide the decrypted data in response. Compared to a credential data store 119 or an HSM 123, the remote credential store 106 could be used in order to provide a device independent location or mechanism for managing private keys and using or implementing various cryptographic operations or primitives.

One or more compliance policies 146 could also be stored on the client device 103. The compliance policies 146 can be referred to by the cryptographic service 116 to determine whether cryptographic operation requests should be processed by the cryptographic service 116 generally, or whether a specified key or cryptographic provider can be used by the client application 113 or user for the requested operation. Compliance policies 146 can be installed and updated using a number of mechanisms. For example, they could be maintained and updated using a mobile device management (MDM), mobile application management (MAM), system or service, created and installed locally, etc.

Figure 2:
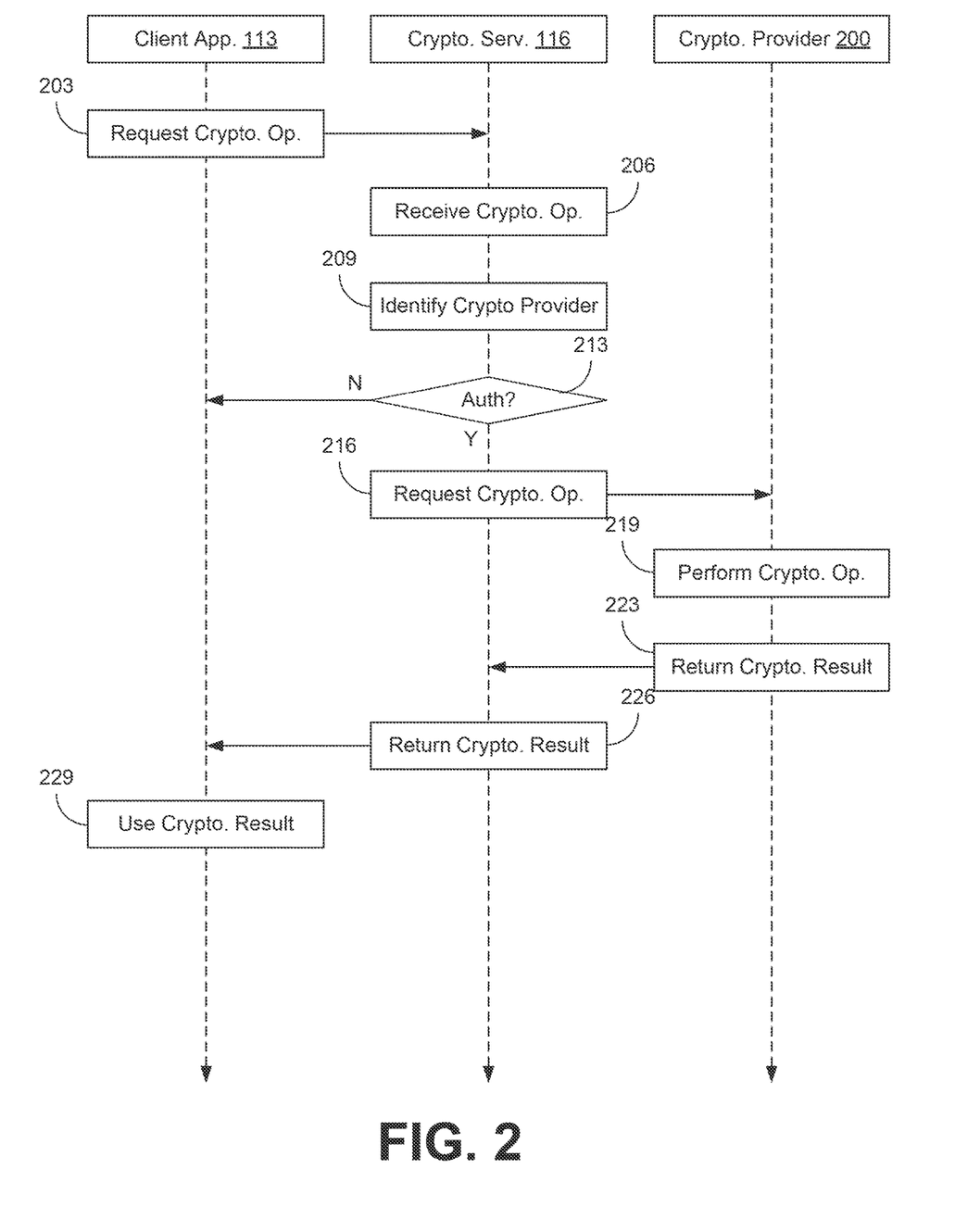
FIG. 2 is a sequence diagram illustrating one example of functionality implemented in the network environment of FIG. 1 according to various embodiments of the present disclosure.

Referring next to FIG. 2, shown is a sequence diagram that provides one example of the interactions between the client application 113, the cryptographic service 116, and cryptographic providers 200 (e.g., the credential data store 119, HSM 123, remote credential store 106, etc.) The sequence diagram of FIG. 2 provides merely an example of the many different types of functional arrangements that can be employed to implement the operation of the depicted portions of the client application 113, the cryptographic service 116, and cryptographic providers 200. As an alternative, the sequence diagram of FIG. 2 can be viewed as depicting an example of elements of a method implemented within the network environment 100.

Beginning with block 203, the client application 113 can sent a request for a cryptographic operation to the cryptographic service 116. The request can include information such as the type of cryptographic operation to be performed (e.g., decryption, signing, etc.), the identifier of the private key to be used (e.g., key identifier 129, HSM key identifier 136, remote key identifier 143, etc.), and the data to be cryptographically processed (e.g., signed, decrypted, etc.). In some implementations, the identity of the client application 113 or the user of the client application 113 (e.g., username, GUID or UUID representing the user, etc.) can be included in the request. In some implementations, the cryptographic provider to be used could also be explicitly identified in the request.

Then, at block 206, the cryptographic service 116 can receive the request for the cryptographic operation from the client application 113.

Next, at block 209, the cryptographic service 116 can identify the cryptographic provider 200 to be used for the cryptographic operation. This can be performed using a variety of approaches. For example, if the request specifies the cryptographic provider 200 to be used, the cryptographic service 116 can read this information from the request. Alternatively, the cryptographic service 116 could search each cryptographic provider 200 installed on or available to the client device 103 for a matching identifier of the private key specified in the request. For example, if the cryptographic service 116 found a matching HSM key identifier 136 for the identifier of the private key specified in the request, then the cryptographic service 116 could determine that the HSM 123 is to be used to process or perform the cryptographic operation. In some instances, if the request specifies a particular cryptographic algorithm to be used, the cryptographic service 116 could identify or select a cryptographic provider 200 that supports the specified cryptographic algorithm.

Moving on to block 213, the cryptographic service 116 can determine whether the requesting client application 113 or user of the client application 113 is authorized to use the identified or specified cryptographic provider 200. If use of the cryptographic provider 200 is authorized, then the process proceeds to block 216. If use of the cryptographic provider 200 is unauthorized, then an error message can be returned to the client application 113 and the process can end.

The cryptographic service 116 can determine whether the requesting client application 113 or user of the client application 113 is authorized to use the identified or specified cryptographic provider 200 by evaluating one or more compliance policies 146. If one or more compliance policies 146 indicate that the client application 113 or user is unauthorized to use the identified or specified cryptographic provider 200, then the cryptographic service 116 can determine that indicate that the client application 113 or user is unauthorized to use the identified or specified cryptographic provider 200. Similarly, if one or more compliance policies 146 indicate that the client application 113 or user is authorized to use the identified or specified cryptographic provider 200, then the cryptographic service 116 can determine that indicate that the client application 113 or user is authorized to use the identified or specified cryptographic provider 200.

Compliance policies 146 could specify that the requesting client application 113 or user of the client application 113 is authorized to use the identified or specified cryptographic provider 200 in a variety of manners. For example, a compliance policy 146 could explicitly allow or disallow the client application 113 or user. As another example, a compliance policy 146 could require that the operating system of the client device 103, client application 113, or the cryptographic service 116 be at least a minimum specified version.

Applicable compliance policies 146 can be selected using a variety of approaches. For example, the cryptographic operation request could include an application identifier, which could identify the specific client application 113 that submitted the cryptographic operation request. The cryptographic service 116 could then search for an applicable compliance policy 146 that matches the application identifier of the client application 113. As another example, the cryptographic request could include a user identifier that identifies the user of the client application 113 or client device 103 who submitted the cryptographic operation request. The cryptographic service 116 could then search for an applicable compliance policy 146 that matches the user identifier of the user of client application 113 or client device 103.

Where compliance policies 146 conflict (e.g., where first compliance policy 146 indicates that the client application 113 or user is unauthorized while a second compliance policy 146 indicates that the client application 113 or user is authorized), various conflict resolution strategies can be used. For example, compliance policies 146 could be sorted into hierarchies, where a compliance policy 146 that is at a higher level in the hierarchy supersedes or overrules a conflicting compliance policy 146 that is at a lower level in the hierarchy. As another example, compliance policies 146 could be sorted based on specificity, where more specific compliance policies 146 (e.g., compliance policies 146 for specific users or client devices 103) supersede more general compliance policies 146 (e.g., a compliance policy 146 for a department, organization, or other group of individuals). Similarly, compliance policies 146 that deny access to a resource, such as the cryptographic provider 200, could supersede other compliance policies 146 that grant access, or vice versa.

If the process proceeds to block 216, the cryptographic service 116 can send the request for the cryptographic operation to the cryptographic provider 200. This can include some or all of the information received at block 206, such as the identifier of the key to be used, the type of cryptographic operation to be performed, and the data to be processed by the cryptographic provider 200. In some implementations where a passcode is required (e.g., to authenticate with the cryptographic provider 200 or to access or decrypt the private key), the cryptographic service 116 could render a user interface prompt to allow the user to input a passcode. The passcode could be included in the request for cryptographic operation provided to the cryptographic provider 200.

Subsequently, at block 219, the cryptographic provider 200 can receive the request and perform the cryptographic operation. Accordingly, the cryptographic provider 200 could search for the key identified in the request and use the key to perform the requested cryptographic operation on the data provided in the request (e.g., decrypt the data, sign the data, etc.).

Once the cryptographic operation is complete, then the cryptographic provider 200 can return the cryptographic result to the cryptographic service 116 at block 223. For example, if a signature was generated, the cryptographic provider 200 could provide the signature to the cryptographic service 116. Similarly, if the cryptographic provider 200 decrypted data using the identified private key, then the decrypted data could be returned to the cryptographic service 116. In some implementations, the result returned by the cryptographic provider 200 to the cryptographic service 116 could be protected from observation by third-parties or applications installed on the client device 103 (e.g., using encryption, secure memory, etc.).

Proceeding to block 226, the cryptographic service 116 can then send a reply to the client application 113, which could include the cryptographic result received at block 223 to the client application 113. Moving on to block 229, the client application 113 can, in turn receive the cryptographic result and make use of it. In some implementations, the result returned by the cryptographic service 116 to the client application 113 could be protected from observation by third-parties or applications installed on the client device 103 (e.g., using encryption, secure memory, etc.).

Figure 3:
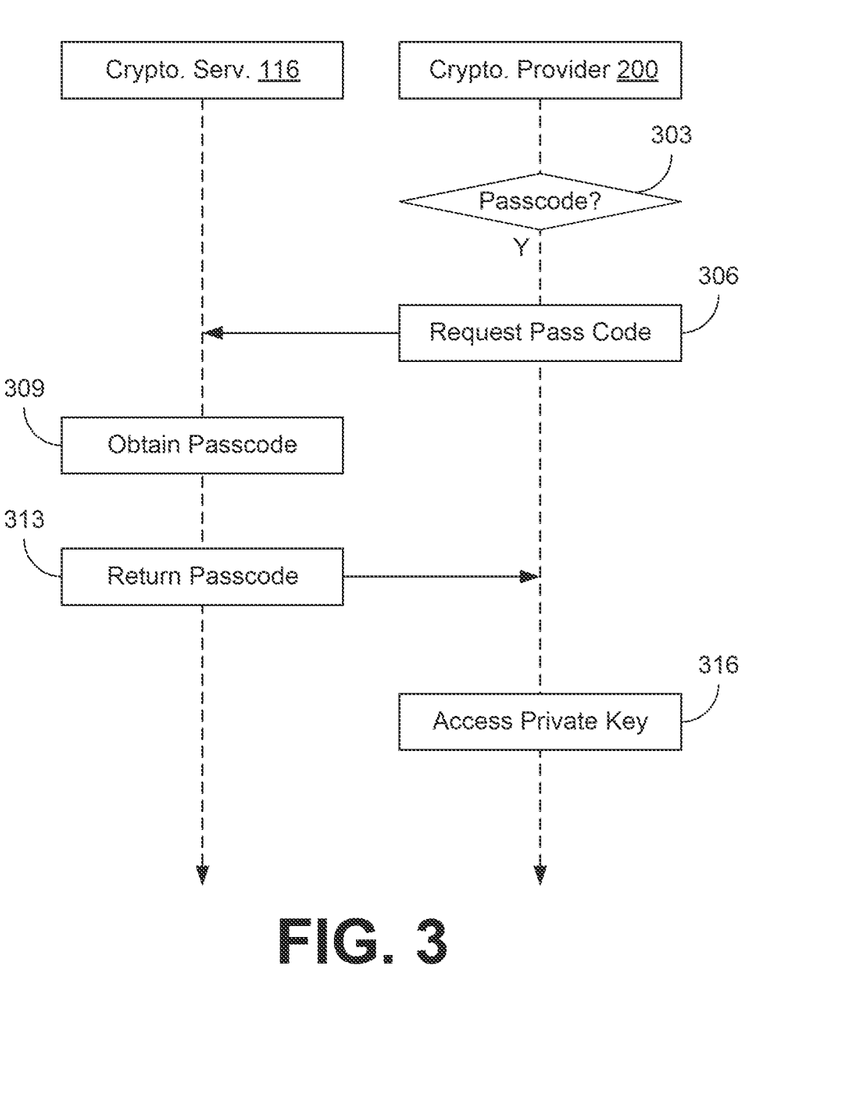
FIG. 3 is a sequence diagram illustrating one example of functionality implemented in the network environment of FIG. 1 according to various embodiments of the present disclosure.

Referring next to FIG. 3, shown is a sequence diagram that provides one example of the interactions between the cryptographic service 116 and a cryptographic provider 200 (e.g., the credential data store 119, HSM 123, remote credential store 106, etc.) to obtain a passcode to access the private key. The sequence diagram of FIG. 2 provides merely an example of the many different types of functional arrangements that can be employed to implement the operation of the depicted portions of the cryptographic service 116 and cryptographic providers 200. As an alternative, the sequence diagram of FIG. 2 can be viewed as depicting an example of elements of a method implemented within the network environment 100.

Beginning with block 303, the cryptographic provider 200 can determine that a passcode is required to access the private key specified in a cryptographic operation request. For example, private keys stored on the client device 103 (e.g., private keys 126 or HSM private keys 133) could be protected using Public Key Cryptographic Standard Number 12 (PKCS #12), which specifies the storage of cryptographic keys in a password protected, encrypted archive. The cryptographic provider 200 could determine that the specified private key is protected using a PKCS #12 archive, and therefore a passcode is required to proceed with the cryptographic operation. As another example, a remote credential store 106 could require user credentials (e.g., a passcode) to be provided to authenticate a user or user request.

Accordingly, the cryptographic provider 200, at block 306, could send a request to the cryptographic service 116 for a passcode. For example, a credential data store 119 or an HSM 123 could send a request for passcode to unlock the PKCS #12 protected key. As another example, a remote credential store 106 could send a request for a passcode (or hash of a passcode) to authenticate the user or user request.

In response, at block 309, the cryptographic service 116 could obtain the passcode from the user. For example, the cryptographic service 116 could cause a user interface prompt to be presented on a display of the client device 103. The user interface prompt could inform the user of the need to provide a passcode and permit the user to enter the requested passcode.

The cryptographic service 116 could then return the passcode to the cryptographic provider 200 at block 313. The cryptographic provider could then, at block 316, use the requested passcode to access the private key. For example, the credential data store 119 or the HSM 123 could use the passcode to unlock the PKCS #12 protected key. As another example, the remote credential store 106 could verify that the user is authorized to access the remote private key 139 specified in the cryptographic operation request.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagram can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
   a computing device comprising a processor and a memory; and
   machine-readable instructions stored in the memory that, when executed by the processor, cause the computing device to at least:
   receive, through an inter-process communication by a cryptographic service executing on the computing device, a cryptographic operation request from a client application executing on the computing device, the cryptographic operation request comprising a key identifier for a private key and data to be cryptographically processed and the cryptographic operation request specifying a cryptographic operation to be performed, wherein the cryptographic operation request is received as an invocation of a standardized application programming interface (API) of the cryptographic service;

identify, by the cryptographic service, a cryptographic provider based at least in part on the key identifier for the private key;

obtain a user identifier associated with a user of the client application;

retrieve a compliance policy associated with the user identifier;

determine, based on the compliance policy associated with the user identifier, whether the client application is permitted to use the cryptographic provider;

in response to determining that the client application is permitted to use the cryptographic provider, send a request to the cryptographic provider to perform the cryptographic operation on the data using the private key, wherein the cryptographic service implements vendor-specific code of the cryptographic provider to execute the standardized API such that the client application can access the cryptographic operation without implementing a vendor-supplied library of the cryptographic provider;

receive, from the cryptographic provider by the cryptographic service, a request for a passcode used to decrypt the private key stored by the cryptographic provider;

display a prompt on a user interface of the computing device to enter the passcode and receive input of the passcode on the user interface by the cryptographic service; and provide the passcode from the cryptographic service to the cryptographic provider, wherein the cryptographic provider decrypts the private key using the passcode and executes the cryptographic operation on the data using the decrypted private key.

2. The system of claim 1, wherein the machine-readable instructions further cause the computing device to at least:

receive, from the cryptographic provider, a cryptographic result of the cryptographic operation; and send a reply to the client application, the reply comprising the cryptographic result.

3. The system of claim 1, wherein the cryptographic provider is a local credential store.

4. The system of claim 1, wherein the cryptographic provider is a remote credential store in data communication with the computing device via a network.

5. The system of claim 1, wherein the cryptographic provider is a hardware security module.

6. The system of claim 1, wherein the machine-readable instructions further cause the computing device to at least:

obtain an application identifier associated with the client application;

retrieve a second compliance policy associated with the application identifier;

determine that the second compliance policy associated with the application identifier conflicts with the compliance policy associated with the user identifier; and apply conflict resolution based on compliance policy hierarchy or compliance policy specificity to determine whether the client application is permitted to use the cryptographic provider.

7. A method, comprising:

receiving, through an inter-process communication by a cryptographic service executing on a computing device, a cryptographic operation request from a client application executing on the computing device, the cryptographic operation request comprising a key identifier for a private key and data to be cryptographically processed and the cryptographic operation request specifying a cryptographic operation to be performed, wherein the cryptographic operation request is received as an invocation of a standardized application programming interface (API) of the cryptographic service;

identifying, by the cryptographic service, a cryptographic provider based at least in part on the key identifier for the private key;

obtaining a user identifier associated with a user of the client application;

retrieving a compliance policy associated with the user identifier;

determining, based on the compliance policy associated with the user identifier, whether the client application is permitted to use the cryptographic provider;

in response to determining that the client application is permitted to use the cryptographic provider, sending a request to the cryptographic provider to perform the cryptographic operation on the data using the private key, wherein the cryptographic service implements vendor-specific code of the cryptographic provider to execute the standardized API such that the client application can access the cryptographic operation without implementing a vendor-supplied library of the cryptographic provider;

receiving, from the cryptographic provider by the cryptographic service, a request for a passcode used to decrypt the private key stored by the cryptographic provider;

displaying a prompt on a user interface of the computing device to enter the passcode and receive input of the passcode on the user interface by the cryptographic service; and providing the passcode from the cryptographic service to the cryptographic provider, wherein the cryptographic provider decrypts the private key using the passcode and executes the cryptographic operation on the data using the decrypted private key.

8. The method of claim 7, further comprising:

receiving, from the cryptographic provider, a cryptographic result of the cryptographic operation; and sending a reply to the client application, the reply comprising the cryptographic result.

9. The method of claim 7, wherein the cryptographic provider is a local credential store.

10. The method of claim 7, wherein the cryptographic provider is a remote credential store in data communication with the computing device via a network.

11. The method of claim 7, wherein the cryptographic provider is a hardware security module.

12. The method of claim 7, further comprising:

obtaining an application identifier associated with the client application;

retrieving a second compliance policy associated with the application identifier;

determining that the second compliance policy associated with the application identifier conflicts with the compliance policy associated with the user identifier; and applying conflict resolution based on compliance policy hierarchy or compliance policy specificity to determine whether the client application is permitted to use the cryptographic provider.

13. A non-transitory, computer-readable medium, comprising machine readable instructions that, when executed by a processor of a computing device, cause the computing device to at least:

receive, through an inter-process communication by a cryptographic service executing on the computing device, a cryptographic operation request from a client application executing on the computing device, the cryptographic operation request comprising a key identifier for a private key and data to be cryptographically processed and the cryptographic operation request specifying a cryptographic operation to be performed;

identify, by the cryptographic service, a cryptographic provider based at least in part on the key identifier for the private key;

obtain a user identifier associated with a user of the client application;

retrieve a compliance policy associated with the user identifier;

determine, based on the compliance policy associated with the user identifier, whether the client application is permitted to use the cryptographic provider;

in response to determining that the client application is permitted to use the cryptographic provider, send a request to the cryptographic provider to perform the cryptographic operation on the data using the private key, wherein the cryptographic service implements vendor-specific code of the cryptographic provider to execute the standardized API such that the client application can access the cryptographic operation without implementing a vendor-supplied library of the cryptographic provider;

receive, from the cryptographic provider by the cryptographic service, a request for a passcode used to decrypt the private key stored by the cryptographic provider;

display a prompt on a user interface of the computing device to enter the passcode and receive input of the passcode on the user interface by the cryptographic service; and provide the passcode from the cryptographic service to the cryptographic provider, wherein the cryptographic provider decrypts the private key using the passcode and executes the cryptographic operation on the data using the decrypted private key.

14. The non-transitory, computer-readable medium of claim 13, wherein the machine-readable instructions further cause the computing device to at least:

receive, from the cryptographic provider, a cryptographic result of the cryptographic operation; and send a reply to the client application, the reply comprising the cryptographic result.

15. The non-transitory, computer-readable medium of claim 13, wherein the cryptographic provider is a remote credential store in data communication with the computing device via a network.

16. The non-transitory, computer-readable medium of claim 13, wherein the cryptographic provider is a hardware security module.

17. The non-transitory, computer-readable medium of claim 13, wherein the machine-readable instructions further cause the computing device to at least:

obtain an application identifier associated with the client application;

retrieve a second compliance policy associated with the application identifier;

determine that the second compliance policy associated with the application identifier conflicts with the compliance policy associated with the user identifier; and apply conflict resolution based on compliance policy hierarchy or compliance policy specificity to determine whether the client application is permitted to use the cryptographic provider.

* * * * *